United States Patent
Wang

(10) Patent No.: US 8,869,178 B2
(45) Date of Patent: Oct. 21, 2014

(54) DIGITAL VIDEO DISC PLAYER

(71) Applicants: Fu Tai Hua Industry (Shenzhen) Co., Ltd., Shenzhen (CN); Hon Hai Precision Industry Co., Ltd., New Taipei (TW)

(72) Inventor: Hua-Yong Wang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/869,967

(22) Filed: Apr. 25, 2013

(65) Prior Publication Data

US 2013/0290989 A1  Oct. 31, 2013

(30) Foreign Application Priority Data

Apr. 27, 2012  (CN) .......................... 2012 1 0126615

(51) Int. Cl.
G11B 17/054  (2006.01)
G11B 17/22  (2006.01)

(52) U.S. Cl.
CPC ............ *G11B 17/054* (2013.01); *G11B 17/226* (2013.01)
USPC .......................................................... 720/615

(58) Field of Classification Search
USPC .......................................................... 720/615
See application file for complete search history.

(56) References Cited

U.S. PATENT DOCUMENTS

| 5,293,362 | A | * | 3/1994 | Sakurai et al. | ............... 369/30.8 |
| 5,386,403 | A | * | 1/1995 | Morioka et al. | ........... 369/30.98 |
| 5,422,869 | A | * | 6/1995 | Versleegers | ................ 369/30.97 |
| 5,563,857 | A | * | 10/1996 | Park | ........................... 369/30.98 |

* cited by examiner

*Primary Examiner* — Allen T Cao
(74) *Attorney, Agent, or Firm* — Novak Druce Connolly Bove + Quigg LLP

(57) ABSTRACT

A digital video disc player includes a housing, a shaft rotatably arranged in the housing, a rotary support accommodated in the housing and fixed to the shaft, a plurality of trays arranged on the rotary support, each of the trays supporting a digital video disc and a driving bar movably connected to the housing, the driving bar driving the shaft to revolve, thereby causing the trays to rotate together with the rotary support. User needs only to push the driving bar to switch the positions of the discs instead of opening the tray to replace new disc.

10 Claims, 8 Drawing Sheets

DIGITAL VIDEO DISC PLAYER

BACKGROUND

1. Technical Field

The present disclosure relates to digital video disc players, and particularly to, a digital video disc player including a rotary support that can cause any one of at least two discs to rotate to a predetermined position.

2. Description of Related Art

Digital video disc players, such as digital video disc players (DVD), or compact disc players (CD) include a tray to hold a disc, and a disc driving apparatus to drive the disc, and a digital video reading/writing unit. Usually, only one disc can be placed on the tray of the digital video disc player. If a user wants to play a new disc, the current playing disc should be removed and be replaced by the new disc. It is desirable and useful if a digital video disc player can process two or more digital video discs, without the removing and replacing process.

Therefore, what is needed is a digital video disc player to alleviate the limitations described above.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding sections throughout the several views.

DETAILED DESCRIPTION

The disclosure, including the accompanying, is illustrated by way of example and not by way of limitation. It should be noted that references to "an" or "one" embodiment in this disclosure are not necessarily to the same embodiment, and such references mean at least one.

Figure 1:
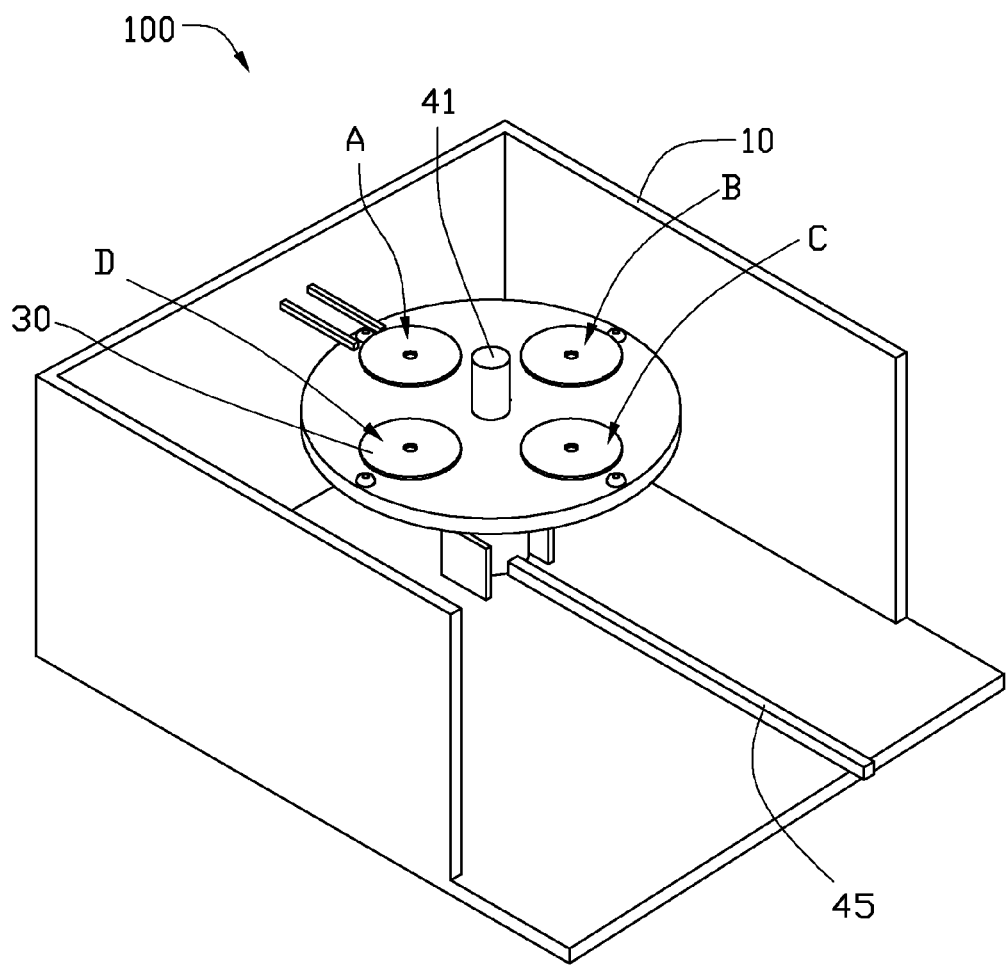
FIG. 1 is an assembled, isometric view of a digital video disc player in accordance with an exemplary embodiment.
Figure 2:
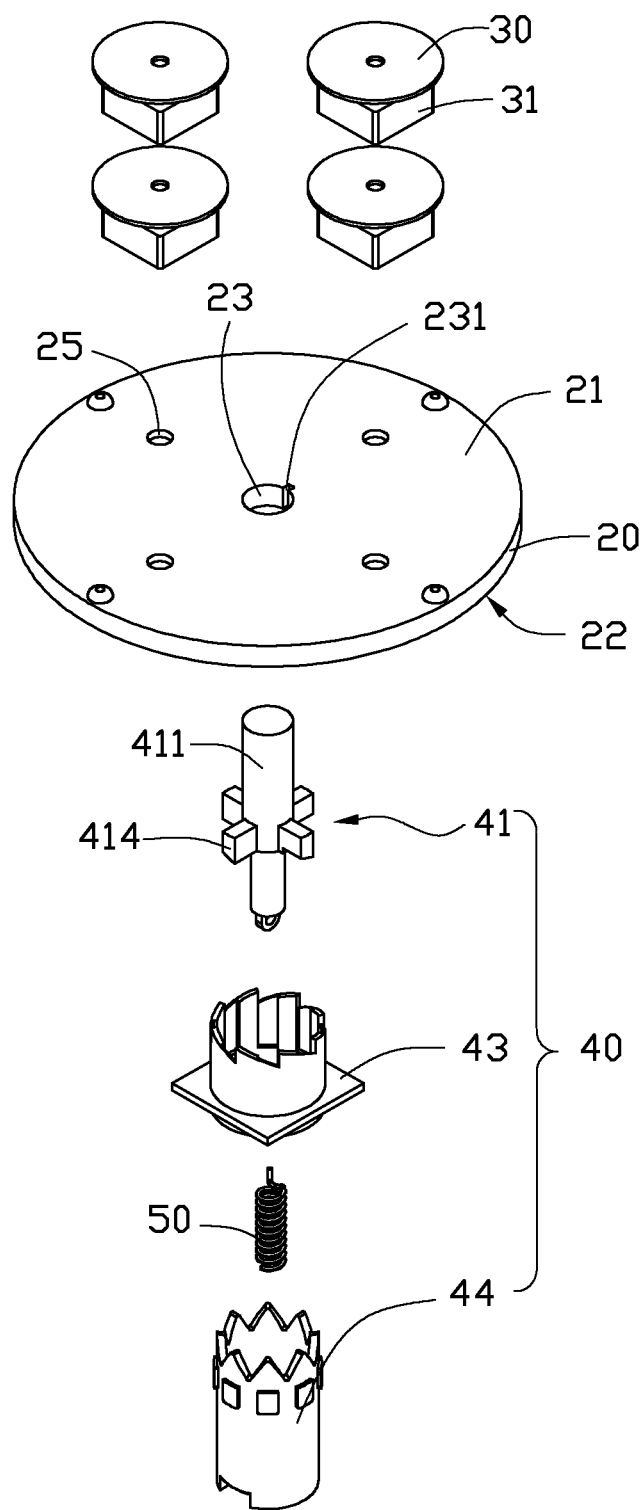
FIG. 2 is a schematic, partial exploded view of the digital video disc player of FIG. 1.

FIGS. 1 and 2 is a digital video disc player 100 with some components omitted for clarity. The digital video disc player 100 includes a housing 10, a disc reading/writing unit (not shown), a rotary support 20, and at least two trays 30. The disc reading/writing unit, the rotary support 20, and the trays 30 are accommodated in the housing 10. In this embodiment, four trays 30 are equidistantly distributed on a top surface 21 of the rotary support 20, as indicated by the arrows A, B, C and D in FIG. 1.

Figure 3:
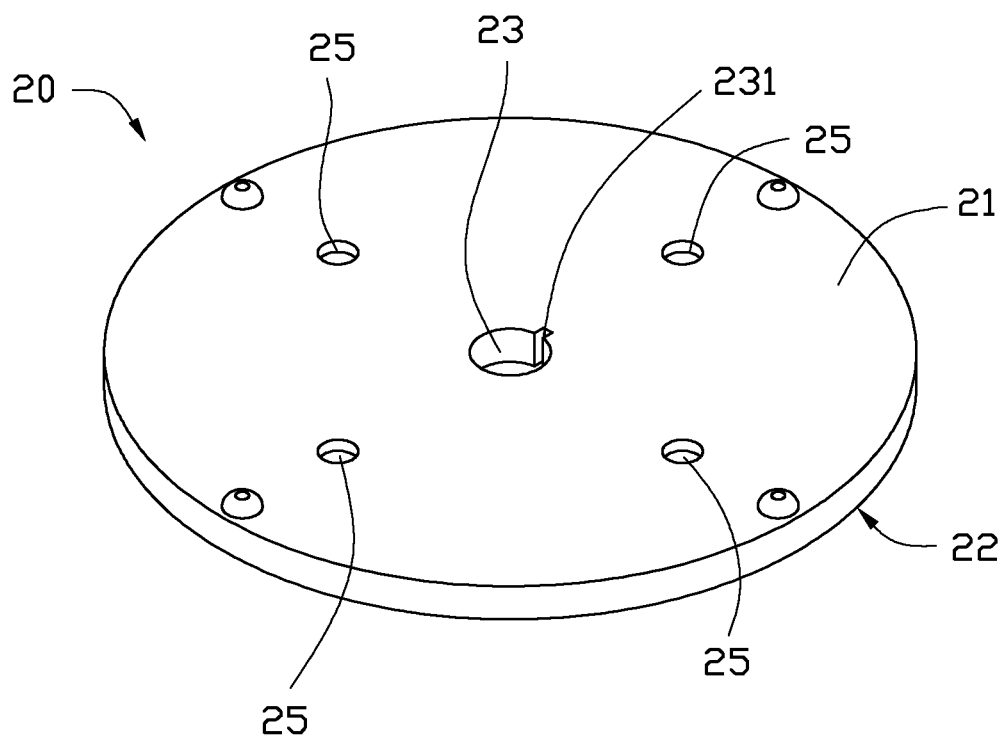
FIG. 3 is a schematic view showing a rotary support of the digital video disc player of FIG. 1.

FIG. 3 in this embodiment, shows that the rotary support 20 is shaped like a circular plate, and includes the top surface 21, a bottom surface 22 opposite to the top surface 21 and a through hole 23 defined in the center of the rotary support 20. A restriction groove 231 is defined in the top surface 21 and communicates with the through hole 23. Four holes 25 are uniformly distributed in the top surface 21 of the rotary support 20.

The digital video disc player 100 further includes a rotary apparatus 40. The rotary apparatus 40 drives the rotary support 20 to revolve a predetermined angle about a shaft 41 when a driving bar 45 of the rotary apparatus 40 is pressed, causing the trays 30 to rotate together with the rotary support 20. When one of the trays 30 is moved to a position under the disc reading/writing unit, the disc reading/writing unit can read data from or write data into the disc held in the tray 30. In this embodiment, the rotary apparatus 40 includes the shaft 41, a spring 50, an external sleeve 43, an internal cylinder 44 and the driving bar 45.

In other embodiments, the rotary apparatus 40 may be modified according to need and is not limited to the construction described above. For example, in another embodiment, the rotary apparatus 40 may only include a shaft 41, and a user can rotate the shaft 41 directly, to drive the rotary support 20 to rotate.

Figure 4:
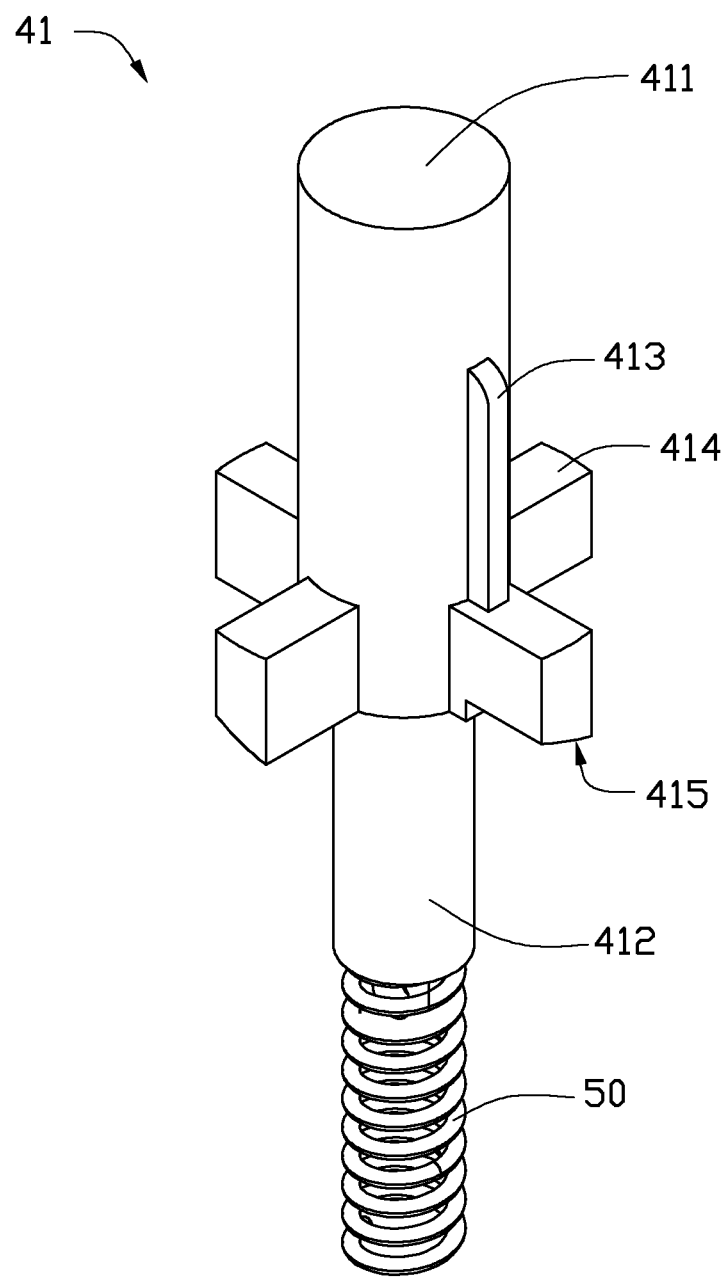
FIG. 4 is a schematic view showing a shaft of the digital video disc player of FIG. 1.
Figure 5:
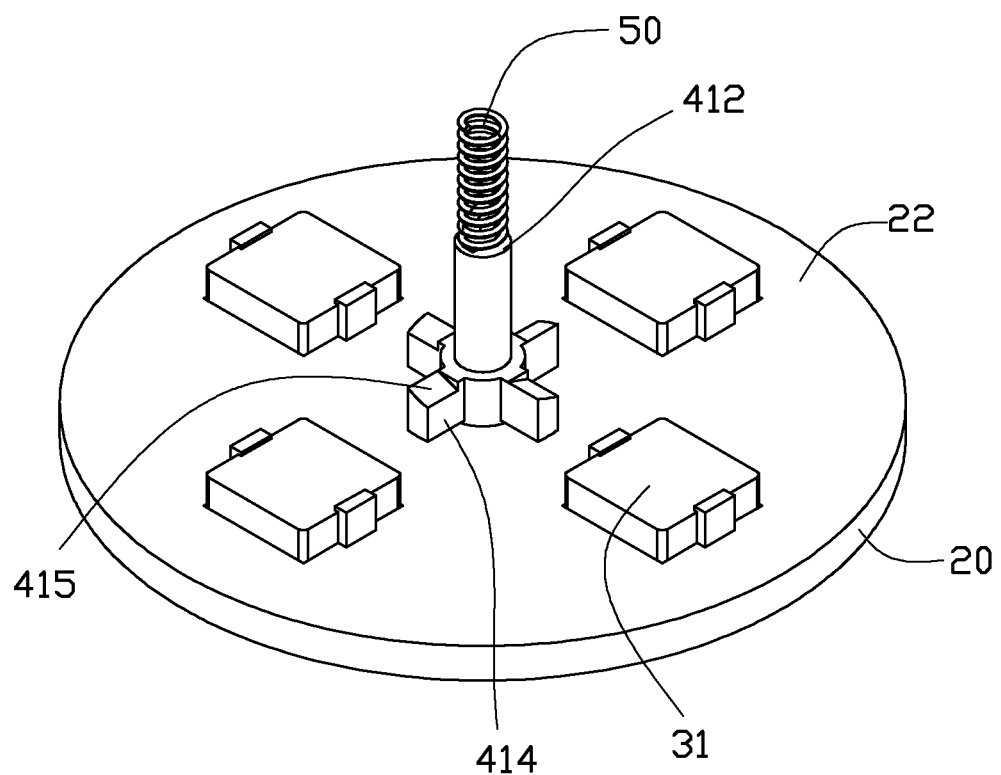
FIG. 5 is a schematic view showing the assembly of the shaft, the rotary support, trays and a disc driving module of the digital video disc player of FIG. 1.

FIGS. 4 and 5 show that the shaft 41 includes an upper end 411, a lower end 412 opposite to the upper end 411 and a protrusion 413 extending from a lateral surface of the upper end 411. The lower end 412 of the shaft 41 extends through the through hole 23 of the rotary support 20 and the protrusion 413 of the shaft 41 is lockingly engaged in the restriction groove 231 to fasten the rotary support 20 and the shaft 41 together.

The digital video disc player 100 further includes four disc driving apparatuses 31 arranged on the bottom surface 22 of the rotary support 20 corresponding to the four trays 30. Each of the disc driving apparatuses 31 includes a driving shaft (not shown) passing through the hole 25 and is connected to one tray 30, and the disc placed on the tray 30 can rotate as driven by the driving shaft.

The shaft 41 further includes four arms 414 radially protruding from a circumferential surface of the shaft 41 and defined perpendicular to the shaft 41, and each two adjacent arms 414 are perpendicular to each other. The four arms 414 are arranged between the upper end 411 and the protrusion 413, and each arm 414 includes a slanted bottom surface 415 closed to the lower end 412. A spring 50 is arranged between the shaft 41 and the housing 10, one end of the spring 50 is connected to the lower end 412 of the shaft 41, and the another end is connected to the housing 10.

Figure 6:
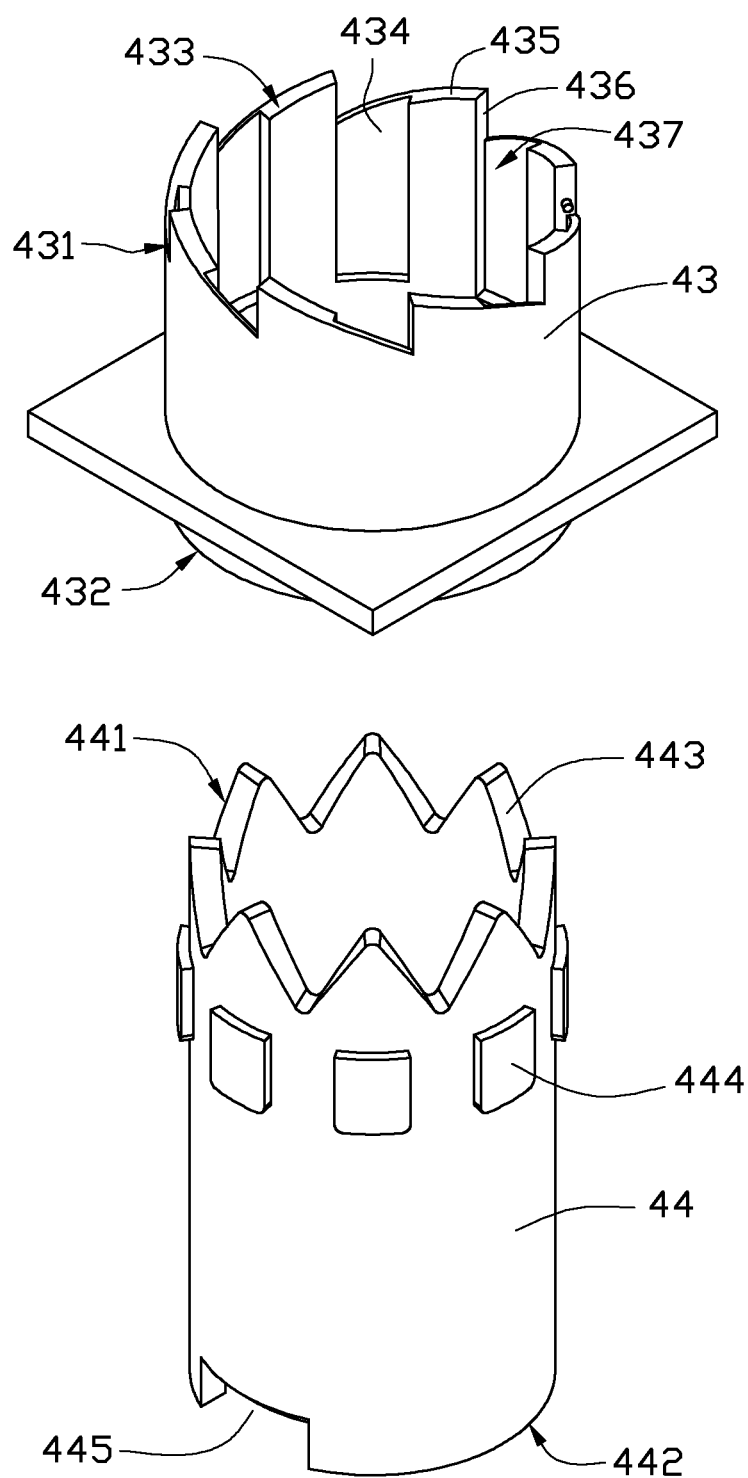
FIG. 6 is a schematic view showing an internal cylinder and an external sleeve of the digital video disc player of FIG. 1.
Figure 7:
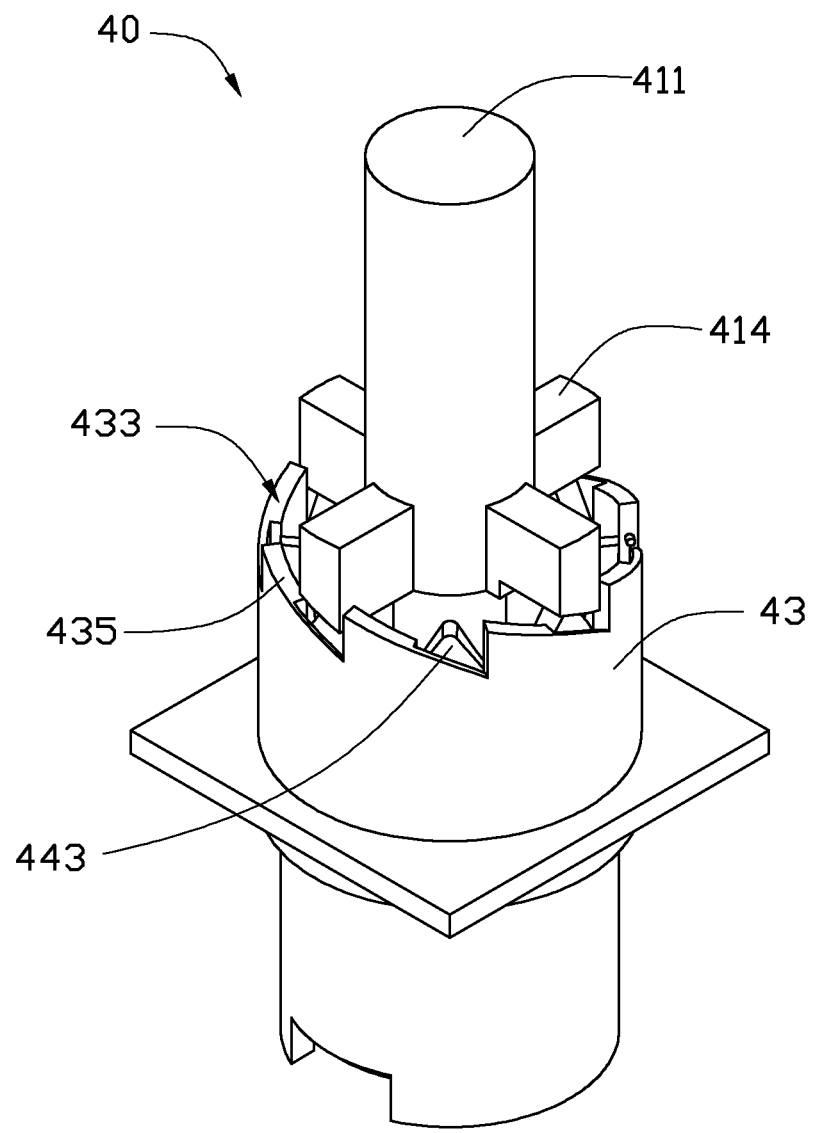
FIG. 7 is a schematic view showing the assembly of the shaft, the internal cylinder and the external sleeve of the digital video disc player of FIG. 1.

FIGS. 6 and 7 show that the internal cylinder 44 is hollow and includes a middle through part and opposite open ends. In this embodiment, the internal cylinder 44 includes a top end 441 and a bottom end 442. Eight teeth 443 uniformly extend from the top end 441 along the longitudinal direction of the internal cylinder 44. Eight equidistantly spaced blocks 444 protrude from the external circumferential wall of the internal cylinder 44, each of the blocks 444 is aligned with a corresponding to one tooth 443 and is arranged below the tooth 443. A cutout portion 445 is defined in the bottom end 442.

The external sleeve 43 is a hollow cylinder and is sleeved around the internal cylinder 44. The external sleeve 43 includes a top portion 431 and a bottom portion 432. Eight protruding teeth 433 are uniformly disposed on the top portion 431, and each of the protruding teeth 433 includes a first edge 435 and a second edge 436. The first edge 435 is a slant edge and the second edge 436 is a vertical edge oriented along the longitudinal direction of the external sleeve 43. Eight equally spaced axial guide grooves 434 are defined in the inner wall 437 of the external sleeve 43. Each of the guide grooves 434 is aligned with a corresponding to a protruding tooth 433, and extends from the first edge 435 of the corresponding protruding tooth 433 to the bottom portion 432. The width of the guide groove 434 is smaller than the length of the first edge 435.

The external sleeve 43 is fixed in the housing 10, and the internal cylinder 44 is received in the external sleeve 43. The eight blocks 444 of the internal cylinder 44 are received in the eight guide grooves 434 of the external sleeve 44, and are capable of sliding in the guide grooves 434. The lower end 412 of the shaft 41 passes through the top end 441 of the internal cylinder 44 and is received in the internal cylinder 44, the imaginary rotation axis of the shaft 41 and the imaginary rotation axis of the internal cylinder 44 extend along the same line. The four arms 414 of the shaft 41 are received in the corresponding guide grooves 434 and capable of sliding in the guide grooves 434.

Figure 8:
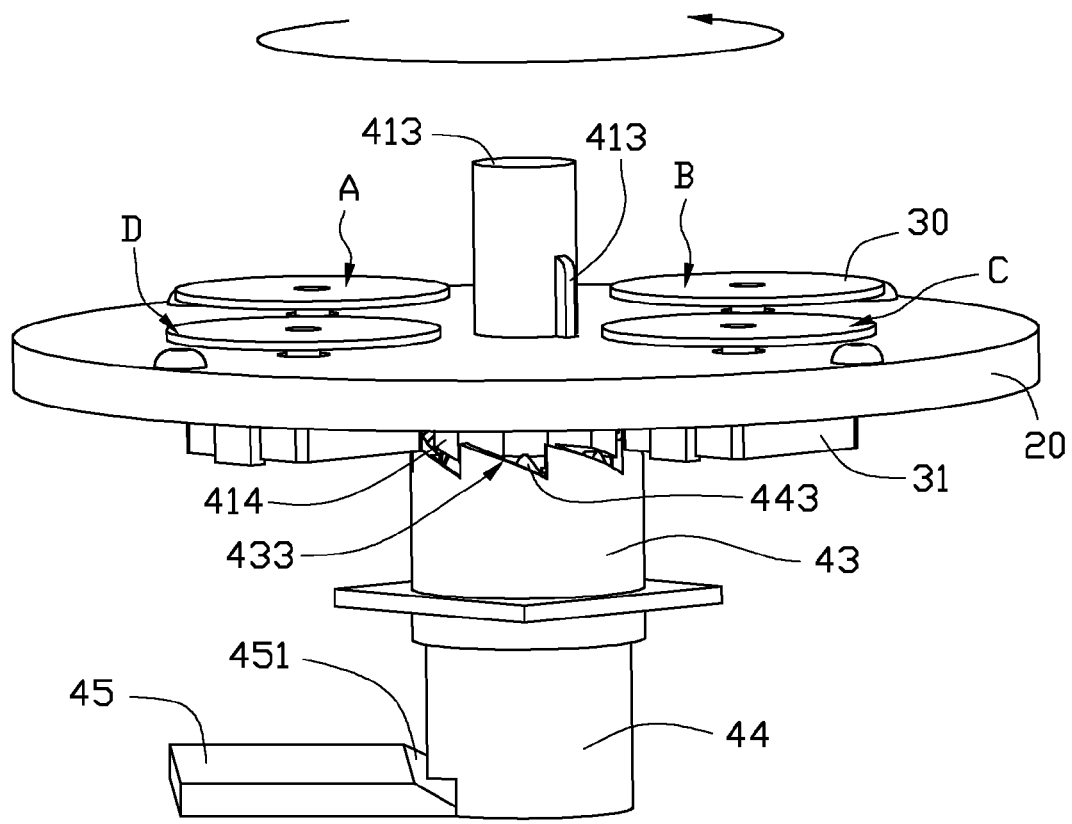
FIG. 8 is a schematic view showing a rotating manner of the digital video disc player of FIG. 1.

FIG. 8 shows that the driving bar 45 includes a wedged distal 451, and an external end protruding from the housing 10. The wedged distal 451 inserts into and resists against the cutout portion 445 of the internal cylinder 44. The internal cylinder 44 is pushed to move up when the driving bar 45 is driven by user. The teeth 443 of the internal cylinder 44 push the arms 414, thus pushing the shaft 41 and the rotary support 20 to move up. The arms 414 are restricted in the guide grooves 434, and abut against the second edge 436 of the protruding teeth 433 when the arms 414 slide out of the guide grooves 434.

Because the teeth 443 resist the slanted bottom surface of the arm 414 and the shaft 41 is pulled by the spring 50, the arm 414 is capable of sliding along the first edge 435 of the protruding teeth 433 when the arms 414 are higher than the protruding teeth 433, thereby causing the shaft 41 to rotate. The shaft 41 stops rotating when the free ends of the arms 414 slide into the adjacent guide grooves 434. In this embodiment, each of the arms 414 moves from a guide groove 434 to the adjacent guide groove 434, and the shaft 41 rotate counterclockwise 45 degrees. Namely, the rotary support 20 rotates counterclockwise 45 degrees along with the shaft 41. When the driving bar 45 is pushed again, the rotary support 20 rotates 45 degrees, causing the trays 30 located at the positions A and B to respectively move to positions D and A. The disc reading/writing unit can read the disc held in different trays 30, and a user needs only to push the driving bar 45 to switch the positions of the discs instead of cutout portion the tray 30 to replace new disc.

In other embodiments, the number of the teeth 443 and the protruding teeth 433 can be varied according to need.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A digital video disc player comprising:
   a housing;
   a shaft rotatably arranged in the housing;
   a rotary support accommodated in the housing and fixed to the shaft, wherein the rotary support is a circular plate, a through hole is defined in a center of the rotary support, a restriction groove is defined in a top surface of the rotary support and communicates with the through hole;
   the shaft comprises an upper end, a lower end opposite to the upper end and a protrusion protruding from a lateral surface of the upper end, the lower end of the shaft extends through the through hole of the rotary support and the protrusion of the shaft is lockingly engaged in the restriction groove;
   a plurality of trays arranged on the rotary support, wherein the trays are equidistantly distributed on the rotary support around the shaft, each of the trays being configured to support a digital video disc; and
   a driving bar movably connected to the housing, the driving bar being configured to drive the shaft to revolve, thereby causing the trays to rotate together with the rotary support.

2. The digital video disc player as described in claim 1, further comprising:
   a spring arranged between the lower end of the shaft and the housing;
   an internal cylinder comprising a top end, a bottom end, a plurality of teeth extending from the top end along a longitudinal direction of the internal cylinder and a cutout portion in the bottom end;
   an external sleeve comprising a top portion, a bottom portion, a plurality of protruding teeth formed on the top portion and a plurality of guide grooves equally spaced axial on an inner wall of the external sleeve, each of the protruding teeth comprising a slanted edge and a vertical edge oriented along the longitudinal direction of the external sleeve; and
   the shaft comprising four arms radially protruding from a circumferential surface thereof, each of the arms comprising a slanted bottom surface;
   wherein the upper end of the shaft passes through the top end of the internal cylinder and is received in the internal cylinder, the arms of the shaft are received in the corresponding guide grooves, the driving bar comprises a wedged distal end for insertion into and resisting against the cutout portion of the internal cylinder.

3. The digital video disc player as described in claim 2, wherein each of the guide grooves is aligned with a corresponding protruding tooth, and extends from the slanted edge of the corresponding protruding tooth to the bottom portion.

4. The digital video disc player as described in claim 2, wherein a plurality of equidistantly spaced blocks formed on a circumferential surface of the internal cylinder, the blocks are aligned with the respective teeth, the blocks are engaged in the respective guide grooves of the external sleeve.

5. A digital video disc player comprising:
   a housing;
   a shaft rotatably arranged in the housing;
   an internal cylinder comprising a top end, a bottom end, a plurality of teeth extending from the top end along a longitudinal direction of the internal cylinder and a cutout portion in the bottom end;
   the upper end of the shaft passes through the top end of the internal cylinder and is received in the internal cylinder;
   a rotary support accommodated in the housing and fixed to the shaft;
   a plurality of trays arranged on the rotary support, each of the trays being configured to support a digital video disc; and
   a driving bar movably connected to the housing, the driving bar comprises a wedged distal end for insertion into and resisting against the cutout portion of the internal cylinder and configured to drive the shaft to revolve, thereby causing the trays to rotate together with the rotary support.

6. The digital video disc player as described in claim 5, wherein the plurality of trays is equidistantly distributed on the rotary support around the shaft.

7. The digital video disc player as described in claim 6, wherein the rotary support is a circular plate, a through hole is defined in a center of the rotary support, a restriction groove is defined in a top surface of the rotary support and communicates with the through hole; the shaft comprises an upper end, a lower end opposite to the upper end and a protrusion protruding from a lateral surface of the upper end, the lower end of the shaft extends through the through hole of the rotary support and the protrusion of the shaft is lockingly engaged in the restriction groove.

8. The digital video disc player as described in claim 7, further comprising:
- a spring arranged between the lower end of the shaft and the housing, and
- an external sleeve comprising a top portion, a plurality of protruding teeth formed on the top portion, the external sleeve further comprising a bottom portion, a plurality of guide grooves equally spaced axial on an inner wall of the external sleeve, each of the protruding teeth comprising a slanted edge and a vertical edge oriented along the longitudinal direction of the external sleeve; and
- the shaft comprising a plurality of arms radially protruding from a circumferential surface thereof, each of the arms comprising a slanted bottom surface, the arms of the shaft are received in the corresponding guide grooves.

9. The digital video disc player as described in claim 8, wherein each of the guide grooves is aligned with a corresponding protruding tooth, and extends from the slanted edge of the corresponding protruding tooth to the bottom portion.

10. The digital video disc player as described in claim 8, wherein a plurality of equidistantly spaced blocks formed on a circumferential surface of the internal cylinder, the blocks are aligned with the respective teeth, the blocks are engaged in the respective guide grooves of the external sleeve.

* * * * *